(12) United States Patent
Chen et al.

(10) Patent No.: US 6,668,293 B2
(45) Date of Patent: Dec. 23, 2003

(54) AUTO-REGISTRATION OF SCANNER

(75) Inventors: Chi-Yuan Chen, Taipei (TW);
Chih-Shin Lan, Taipei Hsien (TW);
Chang-Hwa Yang, Taipei (TW)

(73) Assignee: Netimage Corp., Taipei (TW)

( * ) Notice: Subject to any disclaimer, the term of this patent is extended or adjusted under 35 U.S.C. 154(b) by 382 days.

(21) Appl. No.: 09/754,460

(22) Filed: Jan. 4, 2001

(65) Prior Publication Data

US 2001/0003178 A1 Jun. 7, 2001

(30) Foreign Application Priority Data

Oct. 15, 1999 (JP) .......................................... 088117851

(51) Int. Cl.[7] .............................................. G06F 17/60
(52) U.S. Cl. .............................. 710/72; 710/62; 710/65; 705/23
(58) Field of Search ................................. 235/380–381; 705/1–3, 23; 709/200–202; 710/8–12, 62–65, 72–74

(56) References Cited

U.S. PATENT DOCUMENTS

| | | | | | |
|---|---|---|---|---|---|
| 5,581,460 | A | * | 12/1996 | Kotake et al. | ................. 705/3 |
| 5,765,176 | A | * | 6/1998 | Bloomberg | ................. 715/514 |
| 5,902,984 | A | * | 5/1999 | Planke | ........................ 235/381 |
| 5,983,286 | A | * | 11/1999 | Pakenham | ..................... 710/9 |
| 6,067,625 | A | * | 5/2000 | Ryu | ............................. 713/202 |
| 6,490,637 | B1 | * | 12/2002 | Shih | .............................. 710/8 |

* cited by examiner

*Primary Examiner*—Christopher B. Shin
(74) *Attorney, Agent, or Firm*—J. C. Patents

(57) ABSTRACT

An auto-registration method for scanners. The method includes implanting a serial number into a scanner. When the scanner operates, the serial number is automatically retrieved. If the scanner is linked to a network, the serial number is transmitted to a documentary file inside a registration center through the net. On the other hand, if the scanner is not connected to a network, other data transmission means can be used to carry out the registration. According to the registered information, various post-registration services are executed.

15 Claims, 2 Drawing Sheets

AUTO-REGISTRATION OF SCANNER

BACKGROUND OF THE INVENTION

1. Field of the Invention

The present invention relates to the registration of a scanner. More particularly, the present invention relates to the auto-registration of a scanner.

2. Description of the Related Art

The serial number of a scanner is conventionally registered manually after the purchase of the scanner. In other words, documents containing the serial number and related information of a scanner are provided by a manufacturer. After the scanner is sold to a customer or a reseller, the documents are sent back to the manufacturer by mail or fax.

Although the above document processing arrangement has been in use for many years, there are many drawbacks. First, the identification of serial number holder is difficult because the serial number documents accompanying the machine can be separated out. Due to errors in filing or maintenance, these serial number documents are sometimes lost. Normally, the lost of serial number documents in unlikely to have serious consequences. However, problems may occur when the machine needs to be serviced or repaired within manufacturer's warrantee period. Arguments often break out between the manufacturer and the buyer when serial number data are lost or erroneous.

In addition, since the serial number is kept outside the machine, anybody besides the actual user also has access to the serial number data leading to other problems. For example, as a promotion, manufactures will often offer a rebate, a discount or a gift to customer after receiving back the serial number data. If people other than the user have access to the serial number data, the rules for obtaining the benefits can be breached easily.

Aside from registering the serial number provided by manufacturers, manufacturers sometimes implant the serial number data directly inside a hardware circuit. Although such an arrangement is capable of eliminating the aforementioned drawbacks, each hardware circuit must be fabricated slightly differently because different serial number data has to be incorporated inside each circuit. Hence, cost of production is likely to increase.

In general, the major drawbacks of conventional scanner registration method includes:

1. The serial number may be lost due to filing error. Arguments between the manufacturers and the user concerning the maintenance and repair of the scanner can arise, especially during the warrantee period.
2. Since other people besides the user can have access to the serial number data, intended rebate and gifts can be misused.
3. The implantation of serial number data directly in hardware will increase production cost.

SUMMARY OF THE INVENTION

The invention provides an auto-registration method for scanners. The method includes implanting a serial number into a scanner. When the scanner operates, the serial number is automatically retrieved. As soon as the scanner is connected to a network, the serial number is transmitted to a documentary file inside a registration center.

The serial number is implanted into the scanner by attaching a barcode representing the serial number in a location within image-scanning area of the scanner. Alternative, the serial number is hardwired to an application specific integrated circuit (ASIC) within the scanner so that the serial number can be automatically sensed once the scanner is turned on.

Furthermore, several post-registration services can be carried out after serial number data are established. These post-registration services include return material authorization (RMA), rebate or the establishment of a user file.

The invention also provides a second auto-registration method for scanners. A serial number is implanted into a scanner. When the scanner operates, the serial number is automatically retrieved.

The serial number is implanted into the scanner by attaching a barcode representing the serial number in a location within image-scanning area of the scanner. Alternative, the serial number is hardwired to an application specific integrated circuit (ASIC) within the scanner so that the serial number can be automatically sensed once the scanner is turned on.

In brief, by attaching a bar code representing the serial number to a scanner or hardwiring the serial number to application specific integrated circuit, persons having access to the serial number is limited. By limiting access to the serial number, post sales services such as RMA, rebate or gift award programs can be carried out more smoothly. In addition, the creation of a user file for each customer helps to provide prompt and quality services.

Accordingly, the present invention is to provide an auto-registration method for scanners capable of resolving after-sales services such as return material authorization (RMA) and related problems. In addition, the method facilitates the execution of any rebate or gift award programs to customers as well as the creation of a user file for each customer so that customer can be serviced promptly and appropriately.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
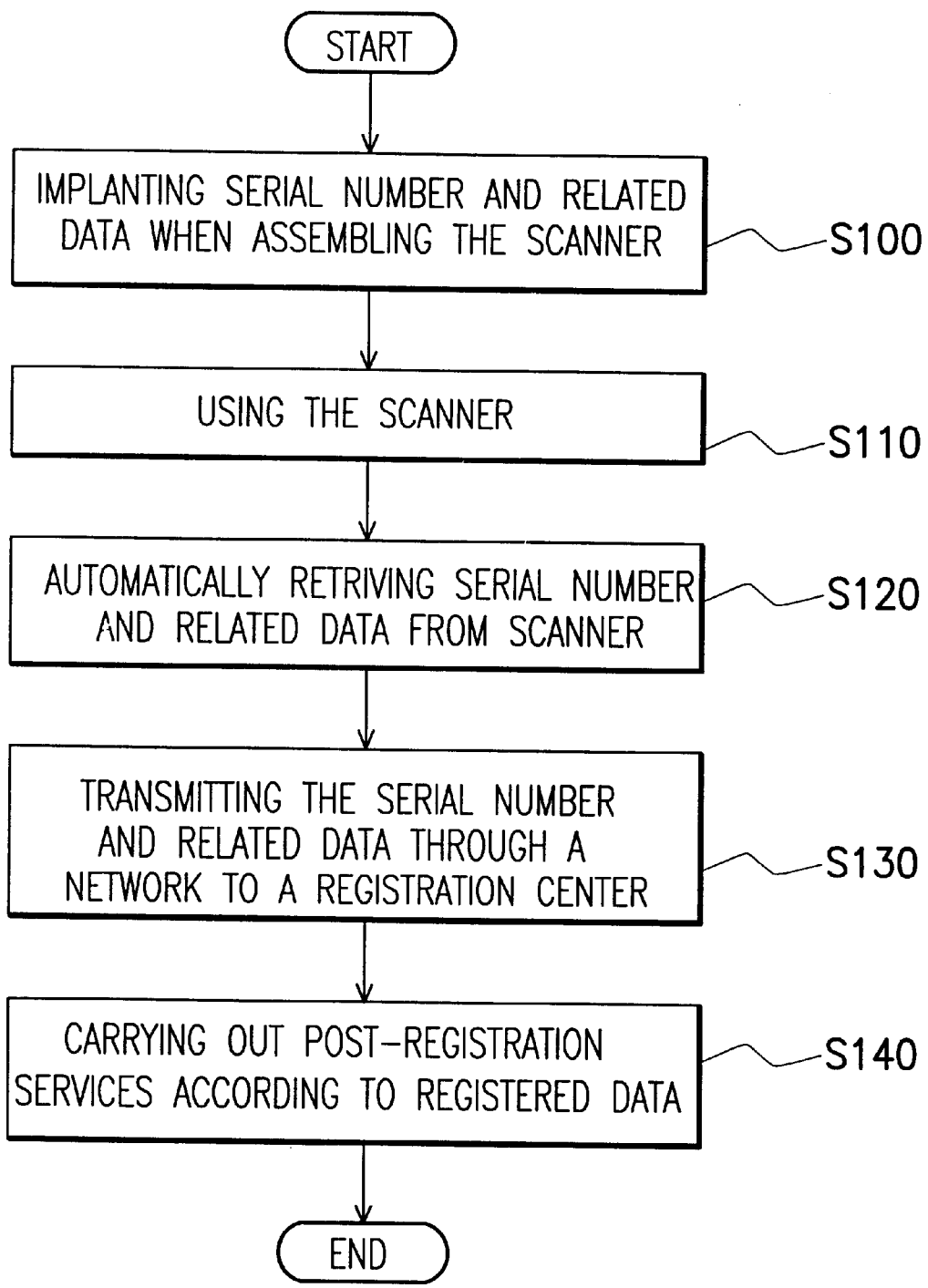
FIG. 1 is a flow chart showing the steps for registering a scanner according to a first preferred embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a flow chart showing the steps for registering a scanner according to a first preferred embodiment of the invention. In step S100, a serial number is implanted into a scanner. Aside from the serial number, other useful data for registration such as scanner model number, place of manufacture or batch number can also be included. The serial number is implanted by attaching a barcode representing the serial number in a location within image-scanning area of the scanner. It will be apparent to those skilled in the art that various modifications and variations can be made to the method of attaching the barcode of the present invention without departing from the scope or spirit of the invention. For example, the barcode can be a one-dimension barcode, two-dimension barcode or other codes by texts or images which can be recognized or recorded by the scanner. Alternative, the serial number is hardwired to an application specific integrated circuit (ASIC) within the scanner.

In step S110, the scanner is used. When the scanner operates as in step S120, the bar code is scanned. Internal software programs are next activated to decode the bar code so that serial number and other registered information within the bar code are retrieved. Alternatively, if the serial number is stored within the ASIC, data may be recalled from the ASIC. These data may then be transferred to a memory for storage. In the next step S130, serial data and other registered information are transmitted to a registration center when the scanner is connected to a network.

After registration, post-registration services are executed in step S140. These post-registration services include return material authorization (RMA), rebate and the establishment of a user profile. Note that all kinds of after-sale services can be executed after the completion of automatic registration.

Figure 2:
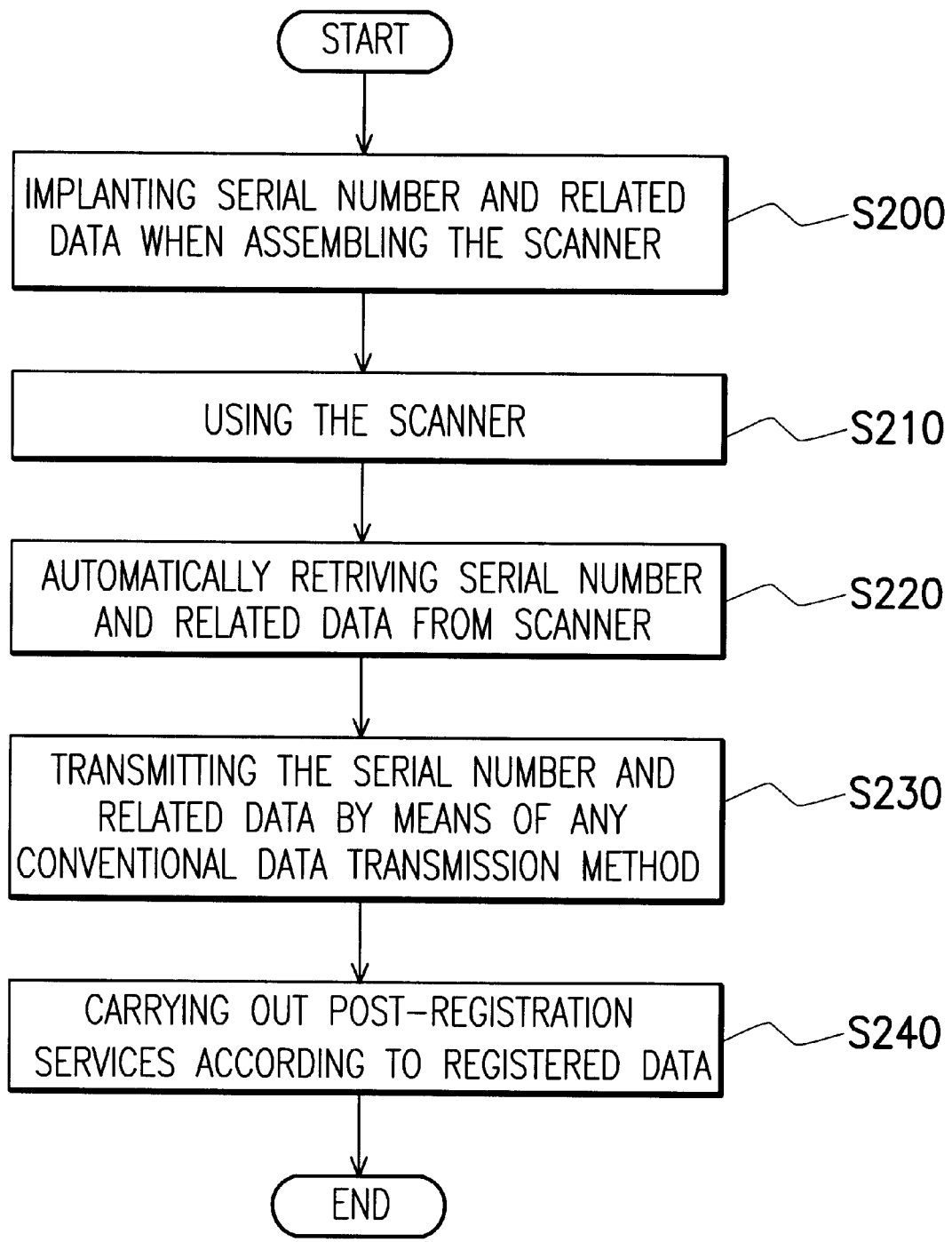
FIG. 2 is a flow chart showing the steps for registering a scanner according to a second preferred embodiment of the invention.

FIG. 2 is a flow chart showing the steps for registering a scanner according to a second preferred embodiment of the invention. In step S200, a serial number is implanted into a scanner. Aside from the serial number, other useful data for registration such as scanner model number, place of manufacture or batch number can also be included. The serial number is implanted by attaching a barcode representing the serial number in a location within image-scanning area of the scanner. Alternative, the serial number is hardwired to an application specific integrated circuit (ASIC) within the scanner.

In step S210, the scanner is used. When the scanner operates as in step S220, the bar code is scanned. Internal software programs are next activated to decode the bar code so that serial number and other registered information within the bar code are retrieved. Alternatively, if the serial number is stored within the ASIC, data may be recalled from the ASIC. These data may then be transferred to a memory for storage or displayed on a computer screen. In the next step S230, serial data and other registered information are sent to a registration center by means of fax, telephone or mail so that the serial number and other registered information can be recorded.

After registration, post-registration services are executed in step S240. These post-registration services include return material authorization (RMA), rebate and the establishment of a user profile. Note that all kinds of after-sale services can be executed after the completion of automatic registration.

In summary, by limiting access to the serial number, post sales services for customers such as RMA, rebate or gift award programs can be carried out more smoothly. In addition, the creation of a customer file facilitates the provision of prompt and quality customer services.

It will be apparent to those skilled in the art that various modifications and variations can be made to the structure of the present invention without departing from the scope or spirit of the invention. In view of the foregoing, it is intended that the present invention cover modifications and variations of the invention provided they fall within the scope of the following claims and their equivalents.

What is claimed is:

1. An auto-registration method for scanners, comprising the steps of:

implanting a serial number into the scanner system;

automatically retrieving the serial number from the scanner system as soon as the scanner operates; and transmitting the serial number to a documentary file in a registration center for registration as soon as the scanner is networked.

2. The method of claim 1, wherein besides the serial number of the scanner, other information such as model number, place of origin and batch number is also included.

3. The method of claim 1, wherein the step of implanting a serial number into the scanner includes attaching a bar code representing the serial number onto the scanner.

4. The method of claim 3, wherein the barcode is one-dimension barcode, two-dimension barcode or barcode-like image which can be recognized by the scanner.

5. The method of claim 4, wherein the bar code is attached to a location within an image-scanning area of the scanner.

6. The method of claim 1, wherein the step of implanting a serial number into the scanner includes hardwiring the serial number within an application specific integrated circuit (ASIC).

7. The method of claim 1, wherein after the step of registering the serial number in the registration center, further includes performing some post-registration services.

8. The method of claim 7, wherein one of the post-registration services includes a return material authorization (RMA).

9. The method of claim 7, wherein one of the post-registration services includes a rebate.

10. The method of claim 7, wherein one of the post-registration services includes establishing a user data file.

11. An auto-registration method for scanners, comprising the steps of:

implanting a serial number into a scanner; and automatically retrieving the serial number when the scanner operates.

12. The method of claim 11, wherein besides the serial number of the scanner, other information such as model number, place of origin and batch number is also included.

13. The method of claim 11, wherein the step of implanting a serial number into the scanner includes attaching a bar code representing the serial number onto the scanner.

14. The method of claim 13, wherein the bar code is attached in a location within an image-scanning area of the scanner.

15. The method of claim 11, wherein the step of implanting a serial number into the scanner includes hardwiring the serial number within an application specific integrated circuit (ASIC).

* * * * *